United States Patent [19]

Laishley et al.

[11] 4,297,734

[45] Oct. 27, 1981

[54] SAMPLED DATA SERVO POSITIONING SYSTEM

[75] Inventors: William J. Laishley; John R. Taylor, both of Winchester, England

[73] Assignee: International Business Machines Corporation, Armonk, N.Y.

[21] Appl. No.: 107,120

[22] Filed: Dec. 26, 1979

[30] Foreign Application Priority Data

Dec. 27, 1978 [GB] United Kingdom ............... 49980/78

[51] Int. Cl.³ ..................... G11B 21/08; G11B 21/10
[52] U.S. Cl. ..................................... 360/78; 360/77; 318/571
[58] Field of Search .................... 360/78, 77; 318/571, 318/561

[56] References Cited

U.S. PATENT DOCUMENTS

| | | | |
|---|---|---|---|
| 3,185,972 | 5/1965 | Sippel | 360/109 |
| 3,758,762 | 9/1973 | Littman et al. | 318/561 X |
| 4,103,314 | 7/1978 | Case | 360/78 |
| 4,133,011 | 1/1979 | Kurzweil, Jr. | 360/78 |
| 4,166,970 | 9/1979 | Cardot et al. | 360/78 X |
| 4,200,827 | 4/1980 | Oswald | 318/561 |

FOREIGN PATENT DOCUMENTS 1527950 10/1978 United Kingdom .

OTHER PUBLICATIONS

IBM J. Res. & Devel., Nov. 1974, pp. 506–512, "Design of a Disk File Head-Positioning Servo", by R. Oswald.

*Primary Examiner*—John H. Wolff
*Attorney, Agent, or Firm*—Walter J. Madden, Jr.

[57] ABSTRACT

A sampled data servo positioning system employs an actuator to move a member between a current and a target position. Incremental position feedback is provided only at sampling times. The system employs a model responsive to a velocity related input signal to produce a continually available model incremental position signal. Phase comparing means indicates phase differences between the model and sampled position signals at the sampling times.

The system has two operational configurations in the first of which a source of saturation control signals is connected to the actuator to cause maximum acceleration or deceleration thereof. In this first configuration, the model is forced to track the actuator motion by means of feedforward plus feedback control. The feedforward signal represents actuator performance while the feedback signal is the position signal phase difference. In the second operational configuration, a velocity profile signal is applied to the model and the actuator is forced to track the model by means of feedforward plus feedback control. The feedback signal is again the position signal phase difference but the feedforward signal is a predetermined signal representing the desired actuator current to execute the velocity profile. The sampled data servo positioning system may be the access motion control system of a sector servo disk file.

13 Claims, 10 Drawing Figures

FIG. 10

SAMPLED DATA SERVO POSITIONING SYSTEM

DESCRIPTION

TECHNICAL FIELD OF THE INVENTION

The present invention relates to servo positioning systems in which only sampled position data is available for feedback control.

BACKGROUND ART

A typical positioning application to which the present invention can be applied is the movement of a magnetic head (transducer) between information bearing concentric tracks in a magnetic disk file of the so called "sector-servo" type. In such a file, servo position reference information is recorded in a plurality of spaced sectors interleaved between larger sectors on which the data is recorded. An advantage of such a system is that the servo information is contiguous with the recorded data so that the data tracks of interest can be followed with greater accuracy and thus packed closer together. The servo sectors must be sampled at times defined by clock signals to enable a position error to be generated for track following purposes.

Such a type of disk file is described in U.S. Pat. No. 3,185,972 (Sippel) which fully describes the track following operation. Although the Sippel patent refers to a coarse positioning system for moving the head between tracks, it does not describe this coarse positioning system in detail.

The time taken to move a head between tracks in a disk file is known as the "access" time and is one of the most important performance characteristics of a file. To minimize the access time for a file of given mechanical configuration and actuator performance requires an access motion control system which will control the velocity of the head in time optimal fashion and which will bring the head accurately to rest on the desired track.

The access motion is, therefore, necessarily of wide bandwidth and the access control system is subject to the stability and error constraints of such systems. Conventionally, these wide band requirements have necessitated the use of a continuous position reference source such as a separate servo disk. In such a system, near time-optimal access motion has been accomplished by means of a derived continuous distance-to-go signal acting on a reference velocity curve generator which, via a high gain closed loop, forces the actual velocity of the head to follow a timeoptimal reference velocity profile from the curve generator.

This conventional approach is not available with a sector servo system since direct head position and velocity information is only available at servo sector sampling times. It is thus difficult to reconcile the use of servo sectors in a disk file with low access times.

Various access control schemes for sector servo files have been proposed in the prior art. One of these, described in U.S. Pat. No. 4,103,314 "Motion Control System" (inventor W. J. P. Case), and assigned to the same assignee as the present applications, is an access control system in which the actuator is energized to cause the head to follow a constant velocity portion of a desired velocity profile. The constant velocity is such that the passage of the head over track centers is synchronized with the timing of the servo sectors. The normal servo sector position error signal, as also generated during track following, may thus be used during the access motion to keep the velocity constant. During brief initial acceleration and final deceleration stages of the motion the full power supply voltage is applied to the actuator under open loop conditions. The motion of the head during an access does not approach time optimal motion since it is at constant velocity over all but a few tracks. The constant velocity is low as the head only traverses one track per two sector periods and must be synchronized with the sector frequency. Furthermore, only in a low velocity system is it possible to effect the final deceleration under open loop conditions without significant final position error.

Another access control system for a sector servo file is described in U.K. Pat. No. 1,527,950, Cardot et al. This patent employs the so-called "bang-bang" technique of controlling head motion in which the maximum available power is used for both acceleration and deceleration. The system is switched between full forward and full reverse power at a point which is calculated from the initial and target track addresses. The servo sectors are coded with track address information which is read by the head during the access motion and used to determine when the power is to be reversed. Although allowing the highest possible speeds to be attained during access motion, the described system does not employ any form of closed loop control during acceleration and deceleration. The position of the head when it comes to rest is thus unknown until a comparison can be made of the actual address of the track over which the head is most nearly situated with the target address. There is provision for a further shift of the head if the two addresses are not equal. Such shifts would add to the average access time.

More recently in the prior art a pending U.S. patent application Ser. No. 811,350 ("Positioning System employing Feedforward and Feedback Control"; Inventor: R. K. Oswald), assigned to the same assignee as the present application, has described an access control system for a disk file which is relevant to the sector servo problem.

The Oswald application is basically concerned with access control systems for use with files having continuous servo position information. It proposes that a combination of feedforward and feedback control can enable high performance accesses even with low bandwidth fed back position information. A feedforward signal, which is a prediction of required drive current in a nominal system, is applied to the head actuator to cause it to execute approximately a high performance (high bandwidth) access. At the same time, low bandwidth head position or velocity information is fed back and compared with a stored velocity profile to correct small deviations between the nominal and actual systems. In one embodiment, transducer incremental position signals are employed as the fed back quantity. These are compared in phase with a "model" incremental position signal derived from a stored acceleration velocity profile and a stored deceleration velocity profile which the system is effectively forced to follow. The Oswald application suggests that this technique is applicable to the problem of sector servo access control.

To complete the discussion of the prior art, reference is made to another U.S. Pat. No. 4,133,011 ("Sampled Data Positioning System Employing a Model of the Physical System for Time Optimal Control"; Inventor: F. Kurzweil Jr.), assigned to the same assignee as the present application. This application describes a sampled data positioning system, specifically the access control system of a sector servo disk file, which employs a model of the physical system to overcome the low bandwidth constraints of fed back position and velocity samples. The model system is an approximate analog of the entire physical system and provides continuous (i.e. high bandwidth) pseudo position and velocity signals. These are applied to an access controller which generates an error signal between a desired reference velocity profile and the pseudo velocity signal exactly in the manner of the conventional system with continuous dedicated servo reference information. The error signal is fed back to the model system but is also applied to control the physical system. The model velocity and position outputs are reset at sampling times to the values of the sampled velocity and position in the physical system. The servo sectors described in the Kurzweil application include track addresses as well as track following position information and the model and physical position signals are absolute (relative to the target address) rather than incremental (relative to the nearest track center).

DISCLOSURE OF THE INVENTION

According to the present invention there is provided a sampled data servo positioning system for moving a member between a current and a target position comprising: an actuator responsive to applied drive signals to move such a member; a position transducer movable with or part of the member for producing signals in response to motion thereof; position signal generating means responsive to the position transducer signals to produce at least one incremental position signal representative of the position of the member at sampling times; a model responsive to an input signal to produce at least one continually available model incremental position signal; profile signal generating means for generating a profile signal, corresponding to a predetermined velocity profile, as an input signal for the model; phase comparing means for comparing and indicating the phase difference between the sampled and model position signals at the sampling times; actuator feedforward signal generating means for generating a feedforward control signal for the actuator corresponding to the predetermined velocity profile; and stage indicating means for indicating various stages of the motion in accordance with predetermined conditions; the system being characterized by switching means responsive to the stage indicating means to switch the system between first and second operational configurations, by a source of saturation control signals of opposite polarity for application to the actuator to cause maximum acceleration or deceleration thereof; and by means for deriving a continuous performance signal representative of actuator motion; and wherein, in the first operational configuration, the switching means connects the saturation control signal source to the actuator and connects a combination of the actuator performance signal as a feedforward input and the position phase difference signal as a feedback input to the model so that the model tracks the actuator system, and wherein, in the second operational configuration, the switching means connects the model input profile signal to the model, and connects a combination of the actuator feedforward control signal as a feedforward input and the position phase difference signal as a feedback input to the actuator so that the actuator tracks the model.

In its second operational configuration, the system according to the invention closely resembles that proposed by Oswald. However, an improvement in access time is offered by providing a first operational configuration in which the actuator is operated at maximum power under effectively open loop conditions. Furthermore, by making the model track the actuator system in the first operational configuration, the model incremental position signal remains continuously representative of the position of the transducer within acceptable limits of phase error and may be used for track counting without the need for stored addresses.

It is also a preferred feature of such a positioning system according to the invention that where the motion includes a first acceleration stage followed by a second acceleration terminating stage, the switching means is responsive to a first stage indication to switch the system into its first operational configuration with the acceleration saturation control signal applied to the actuator and is responsive to a second stage indication to maintain the system in its first operational configuration but with the maximum deceleration saturation control signal applied to the actuator.

This feature enables the model signal to track the actuator and remain representative of actual position during current switching. If the model were driven from the stored profile signal as soon as the acceleration stage was over there would be no guarantee that the actual head velocity would follow that of the profile exactly and the model would be running disconnected from the file. An incremental position signal is only linear over 180° and phase errors greater than this cannot be tolerated without losing track of head position where a count of model position signal increments is maintained as the primary indication of absolute position. To change the current in this way is also faster.

It is similarly a prefered feature of such a positioning system according to the invention that where the motion includes a final deceleration to the target position consisting of penultimate and ultimate stages, the switching means is responsive to a penultimate stage indication to switch the system into its first operational configuration with the maximum deceleration saturation control signal applied to the actuator and responsive to an ultimate stage indication to switch the system into its second operational configuration.

This feature also enables the fastest possible current switching to occur without loss of absolute position. It also permits, as yet another preferred feature of the invention, a system in which the stage indicating means is responsive to equality of a signal representative of the actuator current and the actuator feedforward signal to change from the penultimate to the ultimate stage.

Yet another preferred feature of the invention is a system in which the motion includes a constant velocity stage corresponding to movement at a maximum permitted velocity, the switching means being responsive to a constant velocity stage indication to switch the system into its second operational configuration.

A preferred feature of the model in systems according to the invention is that it comprises both a velocity model and a position model which produces the model incremental position signal. In systems having such a model the actuator performance signal is preferably representative of actuator current and is applied to the velocity model which integrates it to produce a model velocity signal for application to the position model in the first operational configuration. In the second operational configuration the profile signal is preferably a velocity profile signal which is applied directly to the position model.

Systems employing such a velocity profile signal preferably include as part of the profile signal generating means, a store from which the velocity profile signal is read out as a function of the position of the member, and normalising means for normalising the velocity profile to the value of the model velocity output when the system is switched from its first to its second configuration.

Preferably the position model comprises a voltage controlled oscillator to which either the model velocity or the velocity profile signal is applied, a counter for counting the oscillator output pulses, means for reversing the direction of counting in response to the counter reaching either a maximum or a minimum count, and a digital to analog converter for converging the count to an analog model incremental position signal.

Finally, it is a preferred feature of any such positioning system according to the invention that the actuator feedforward signal generating means includes a store from which the actuator feedforward control signal is read out as a function of the position of the member, the feedforward control signal being zero at greater than a predetermined distance from the target position, and being of substantially trapezoidal form between the predetermined distance and the target position so as to include an initial portion of gradually diminishing amplitude and a terminal portion of steeply falling amplitude which falls to zero at the target position.

It should be recognised that although the invention is applicable to any sampled data servo positioning system, it is particularly applicable to a sector servo disk file in which the position transducer is a transducer for reading information from the disk file and the position signal generating means is responsive to signals read by the transducer from the servo sectors of the disk file.

BRIEF DESCRIPTION OF THE DRAWINGS

FIG. 10 is a truth table illustrating the logical operation of the phase comparator circuit of FIG. 9.

DETAILED DESCRIPTION

Since the preferred embodiment of a sampled data servo positioning system according to the present invention is incorporated in a disk file of the sector servo type, where it is employed to control the movement of read/write transducers between tracks, it is desirable firstly to describe those features of the file relating to the sector servo information.

Figure 1:
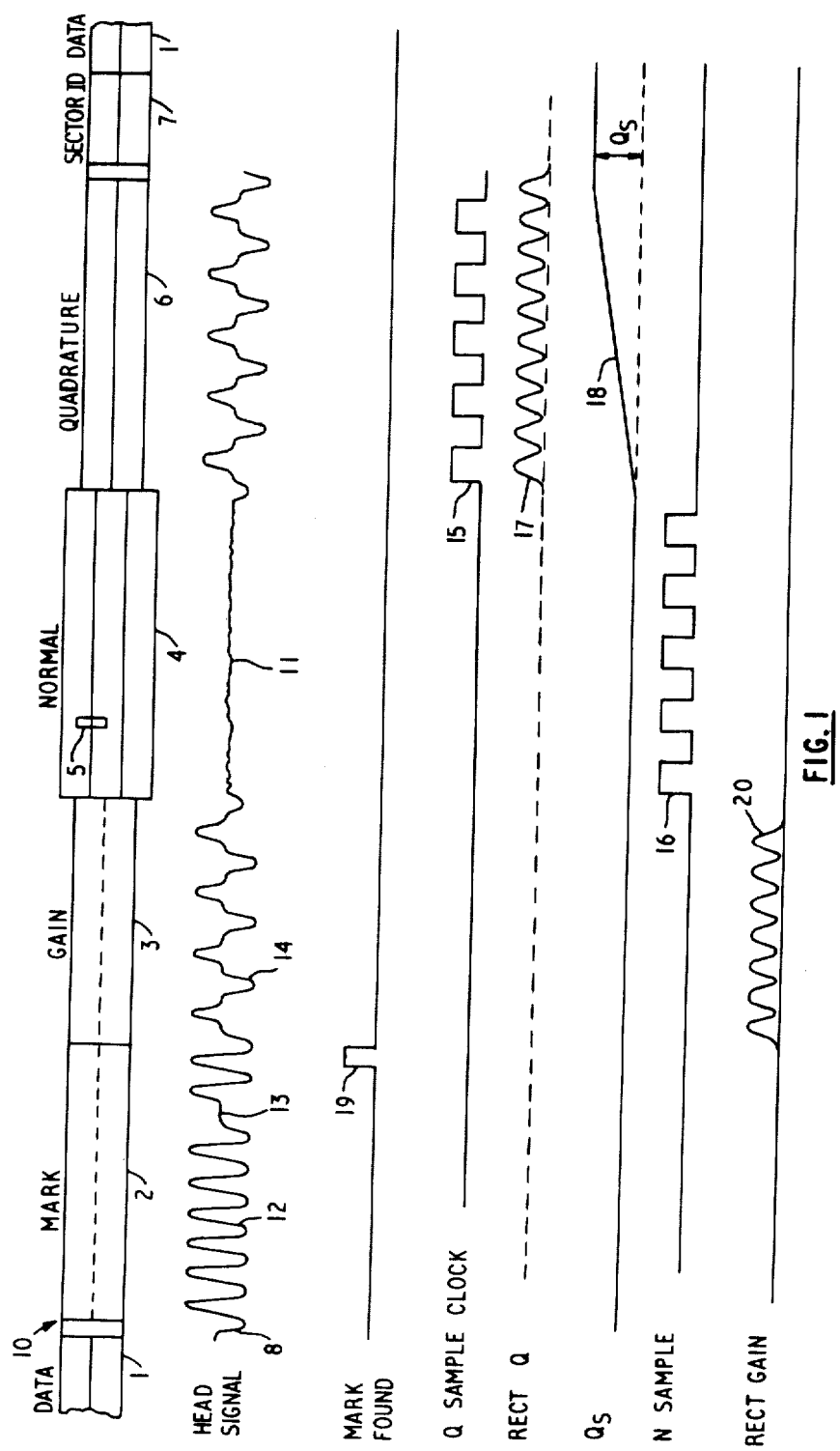
FIG. 1 shows a pattern of information on a disk of a magnetic disk file, including sector servo position information, and waveforms associated with the information and with the circuit of FIG. 2.

The general pattern of information on the disk is shown in block 10, FIG. 1, which represents a circumferential band of information bearing tracks, drawn rectilinearly for convenience. Block 10 includes, in particular, a portion of the band of tracks which lies within a sector of servo position information. This servo sector is one of a number of such sectors disposed at equal angles about the disk axis and which extend from the inner diameter to the outer diameter of the usable recording area. Data is recorded in areas 1 along equally spaced concentric tracks between these servo sectors.

The start of a servo sector is indicated by a mark field 2 of magnetic transitions, in radial alignment on every track, which is distinguishable from the permitted patterns of recorded data. Following the mark field is a gain field 3, also of radially aligned magnetic transitions, which is employed for automatic gain control. A normal (N) servo field 4 contains a checkerboard pattern of magnetisation in which transitions are aligned radially but are of opposite sense in alternate tracks. The tracks of the normal field are arranged so that the boundary between them lies on the center line of the data tracks. This information is employed to provide an indication of the position of a read/write head 5 relative to the nearest track center and to detect the "on-track" condition.

Following the normal field is a quadrature (Q) field 6 containing an identical checkerboard pattern to the normal field but offset from it radially by half a track width so that the quadrature pattern tracks are aligned with the data tracks. The quadrature field is employed to provide additional information on the head position.

The quadrature field terminates the servo sector and is followed by sector identifying information 7 and the next sector of data.

Figure 2:
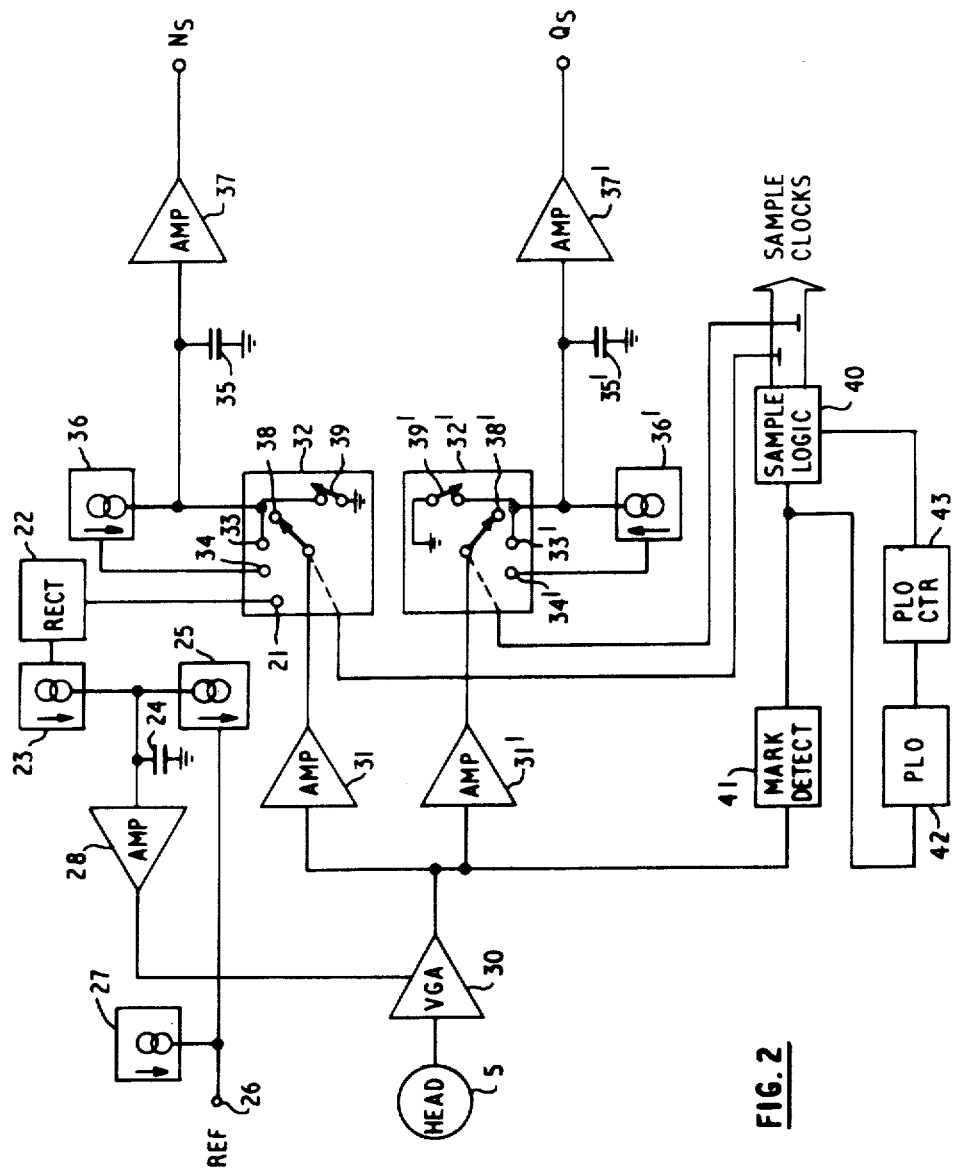
FIG. 2 shows a sector servo pattern demodulating circuit for producing sampled transducer position signals in a sampled data servo positioning system according to the present invention.

FIG. 2 shows a circuit for generating normal and quadrature head position signals by demodulation of the signal read by head 5 from the rotating disk. The signal from head 5 as it passes over the block 10 of information is shown as waveform 8 in FIG. 1. The signal is amplified in a variable gain amplifier 30 and converted to proportional currents by amplifiers 31 and 31' in parallel channels. The outputs of these amplifiers are applied to demodulator switch circuits 32 and 32' respectively. The switch circuits are controlled by sample clocking signals generated by a sample logic circuit 40. A sample clock signal for demodulating the head signals 11 from the N region 4 is shown in waveform 16. A sample clock signal for demodulating the head signals from the Q region 6 is shown in waveform 15.

The demodulation operation, described here for the Q signals, involves the rectification of the head signal from the Q region by inverting alternate peaks to produce the rectified signal 17. This is achieved by switching the arm of switch 32' alternately between contacts 33' and 34' in response to the level of signal 15. The signal is switched either directly to integrating capacitor 35' via contact 33' or to a current mirror 36' which effectively inverts the current to capacitor 35'. The rectified signal 17 is integrated by capacitor 35' and amplified by amplifier 37' as shown by output signal 18 whose peak value is the demodulated quadrature position signal Qs. Contact 38' of the demodulator switch is an "off" position and subsidiary switch 39' for connecting capacitor 35' to ground is a reset switch.

The Qs position error signal illustrated in FIG. 1 corresponds to the situation where head 5 is exactly aligned with the data tracks 1 and quadrature tracks 6 and is centered over a boundary of normal tracks 4. This position is referred to as the "on-track" position.

The head signal from the N field 4 is demodulated in exactly the same manner as the Q field signal by correspondingly numbered (unprimed) circuitry. Since the head 5 is located over the boundary between two tracks it will receive equal and opposite signal contributions from the transitions on these tracks and produce a signal 11 whose average value is zero. Lack of precise alignment in transitions on adjacent tracks results in noise which is removed by integrating capacitor 35.

The sample clock signal from sample logic 40 are generated in response to the detection of the mark pattern 12 at the beginning of a servo sector by mark detection circuit 41. In principle, this circuit is the same as a conventional address mark detection circuit employed in the data channel of a disk file to identify the start of sectors of data or index points. The principle is to detect a special transition pattern which breaks the rules for encoding data so that the pattern cannot be confused with data. The mark pattern produces a sequence of evenly spaced peaks one of which, at 13, is missing. The frequency of the peaks is different from the data frequency. The mark detector employs a zero crossing detector and a peak detector to set and reset a latch. Timing windows generated by associated counter circuitry allow the time of occurrence of the zero crossing to be checked for correspondence with the mark pattern. If the zero crossings occur as expected a "mark found" signal 19 is produced.

This mark found signal is applied to the sample logic 40 and also to a phase locked oscillator 42 to synchronise it with the occurrence of the sectors. The PLO 42 produces an output which is a multiple of the sector frequency and is applied to a counter 43 to produce submultiples of the PLO output for the sample logic 40.

The sample logic is responsive to the outputs of the PLO counter and to the "mark found" signal to produce sample clocking signals for controlling the servo position sampling operation and other aspects of the head positioning system to be described below. Among these sample clocking signals are the signals 15 and 16 for alternating the switches 32 and 32' between positions 33, 33' and 34, 34' to demodulate the signals from the N and Q fields.

Another sample clock signal (not shown) derived directly from the mark found signal causes the arm of switch 32 to be initially closed on contact 21 for the duration of the gain field 3. The head signal 14 from the gain field is full wave rectified in a rectifier 22 to produce the signal 20 shown in FIG. 1. This signal is applied to a current source 23 which applies a charging input to a capacitor 24. The charging input is offset by a discharging input applied by a further current source 25 in response to a track reference current applied at a terminal 26. The track reference current represents the desired off track gain in volts/track for the N and O position samples. If there is a net current to capacitor 24 the resultant voltage across the capacitor at the end of the gain field is amplified in amplifier 28 and is used to control the gain of VGA 30. In this way the position samples Ns and Qs are normalised in terms of off-track gain by the operation of the gain control circuitry.

Figure 3:
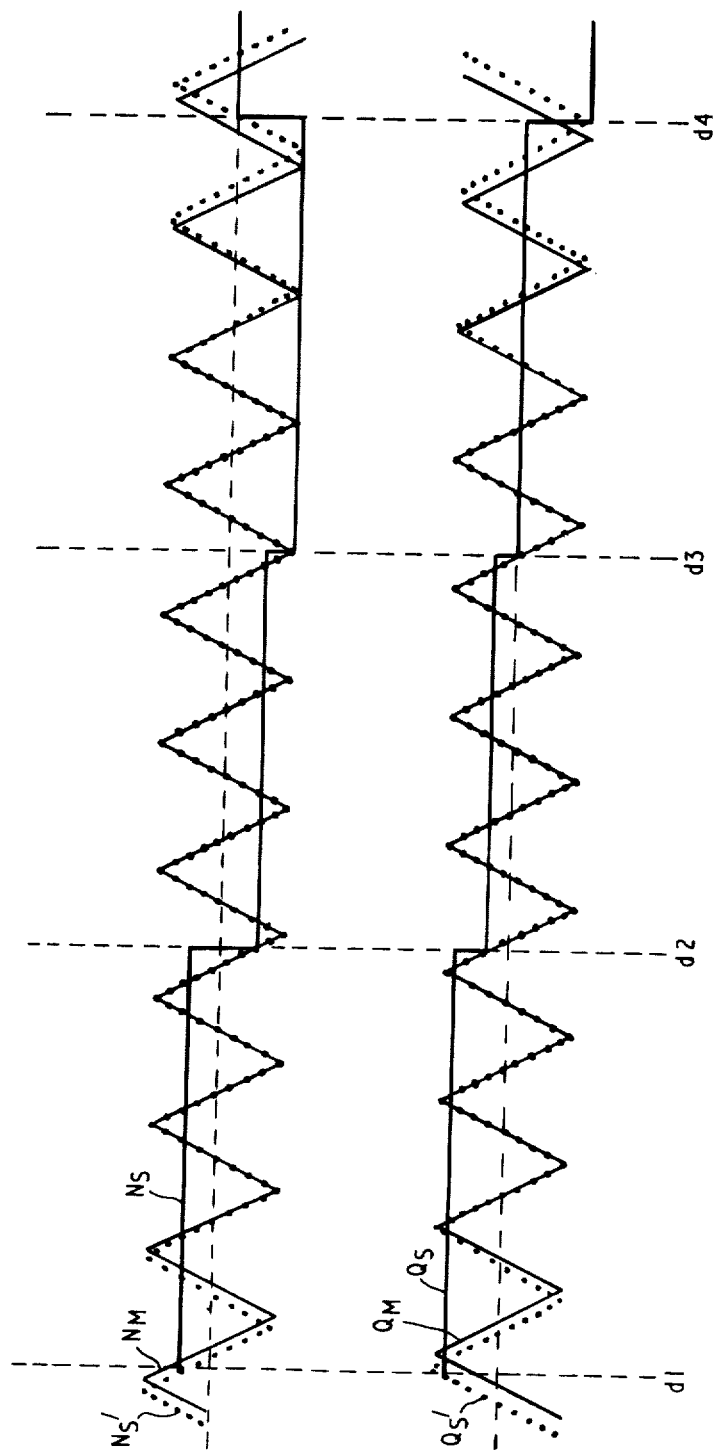
FIG. 3 shows position signals produced by the circuits of FIGS. 2 and 6 during motion of the transducer.

The position samples Ns and Qs are employed in both the track following and access motion control aspects of head positioning. In track following, the signal Ns is nulled in a closed feedback loop to cause the head 5 to follow a data track. This aspect of position control is not relevant to the invention and no description of the track following system is considered necessary. Both the samples Ns and Qs are employed in the access motion (or seek) control system to be described below. FIG. 3 shows, by way of example, how these position samples vary with motion of the head 5 across the tracks. A constant velocity of motion is assumed so that the basic variation of offtrack position with time is a regular triangular function. The actual variation of head position with time is illustrated by the dotted lines Ns' and Qs'. Superimposed on these are model position signals Nm and Qm whose purpose and generation will be described later. Exaggerated phase differences are shown between the function pairs Ns', Nm and Qs', Qm at the opposite extremes of the drawing. In the center of the drawing they are coincident.

The actual head position samples Ns and Qs, generated by the circuit of FIG. 2, are shown by continuous lines. The levels of Ns and Qs remain constant between servo sectors and are reset to new values at sampling times. Three such resettings are shown though their location is illustrative only. It has been assumed that the head 5 is crossing several tracks between samples which is the case only at the higher velocity portions of the seek motion. It will be noted that there is no relationship between the sampling points and the position of the head relative to a track.

Figure 4:
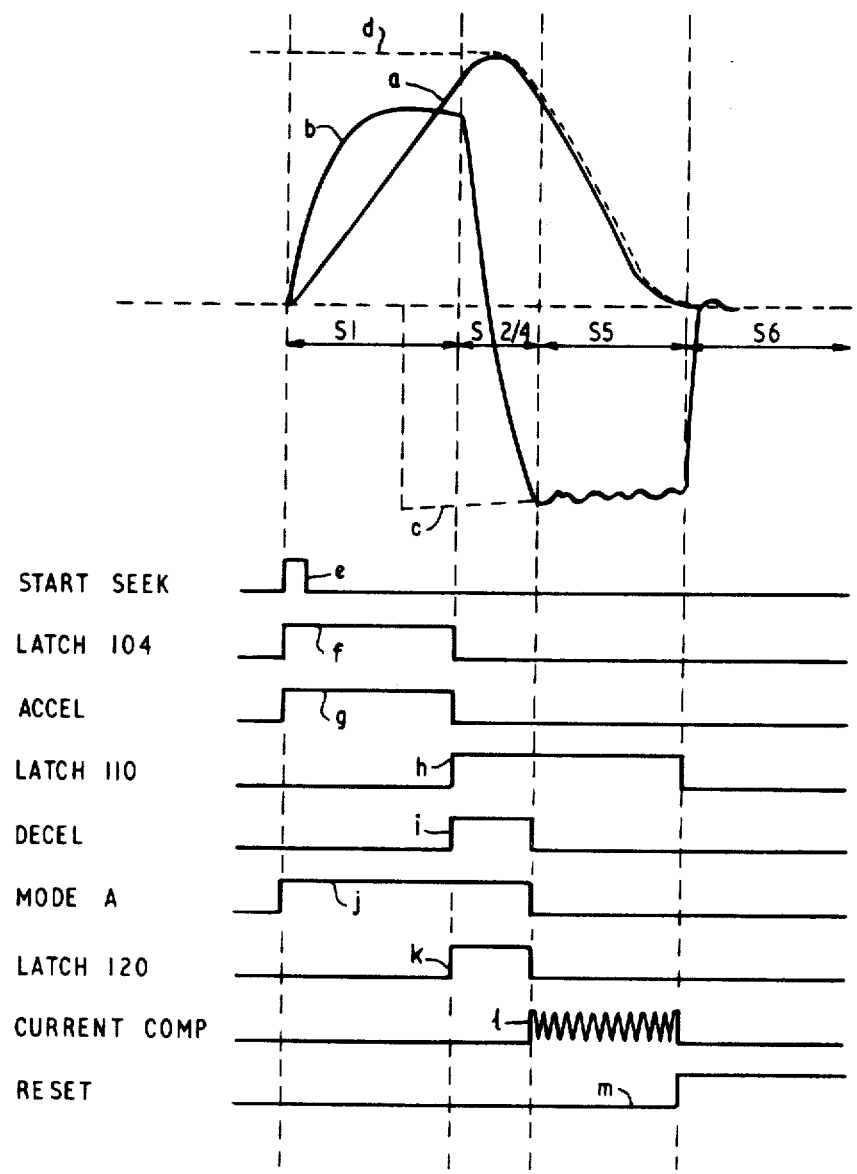
FIG. 4 shows the variation of transducer velocity with time during a relatively short motion controlled by a system according to the invention and shows various control waveforms occurring in the circuit of FIG. 7.
Figure 5:
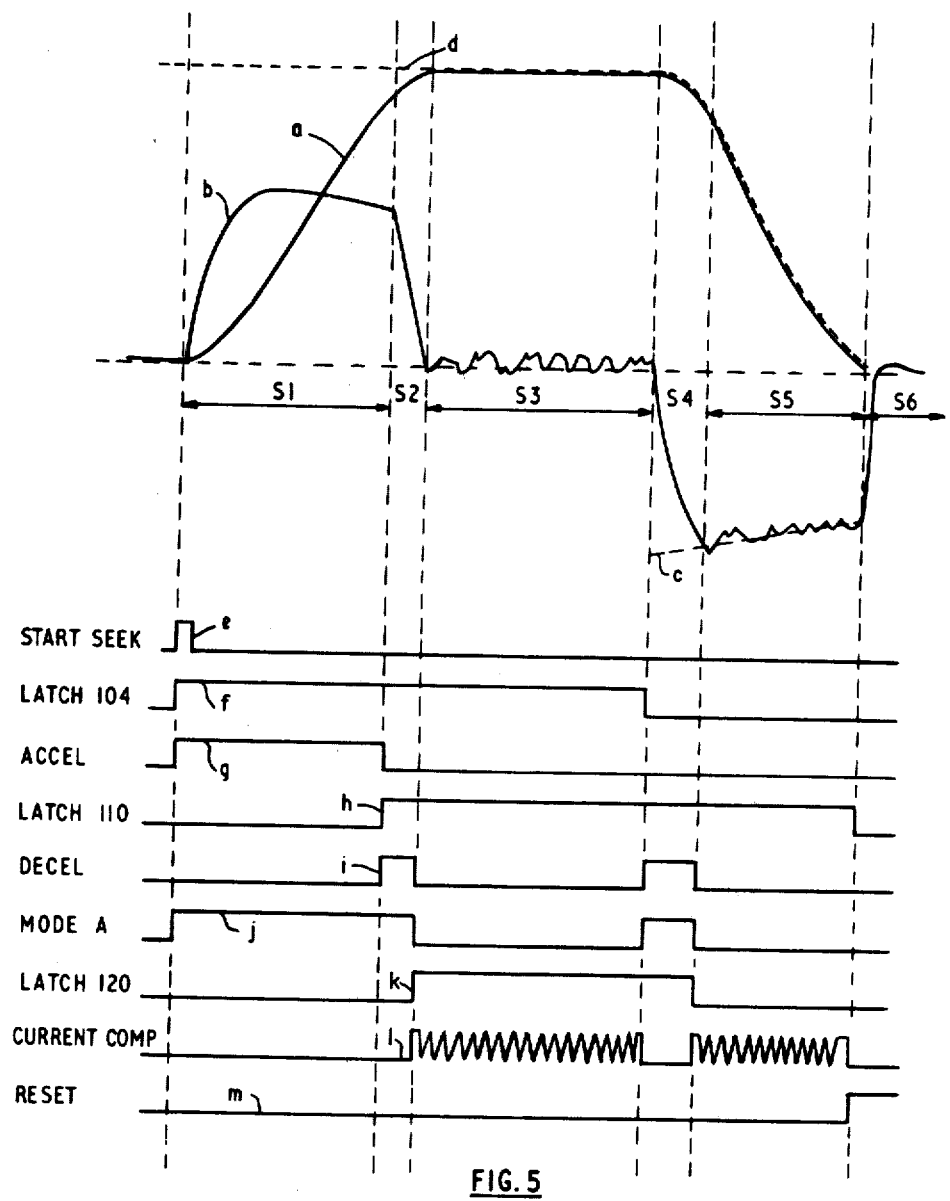
FIG. 5 shows the same information as FIG. 4 for a relatively longer motion.

Before describing the detailed circuitry of the access motion control system (FIGS. 6 and 7) it is desirable to consider in detail the motion of the head during a typical seek. Waveforms (a) of FIGS. 4 and 5 illustrate the variation of velocity with time for a short and a long seek respectively. Also shown are three other functions, namely the head actuator coil current (waveform b), the feedforward current function (waveform c), and the velocity profile (waveform d) all of which will be discussed below. For control purposes the motion is divided into distinct stages S1 to S6 in FIG. 5 and into corresponding stages S1, S2/4, S5 and S6 in FIG. 4. Stage S2/4 corresponds to the combination of stages S2 and S4 in FIG. 5, omitting stage S3. Subsequent references to stage S2 or S4 should be taken also to refer to the corresponding portion of S2/4, these stages will be related below to particular operational configurations of the circuitry of FIG. 6.

It can be seen from FIG. 4, that the head is accelerated from rest during stage S1 until, during stage S2/4, it reaches a peak velocity at about the mid-point of the distance to be travelled. The head is decelerated from the peak velocity during the remainder of stage S2/4 and throughout stage 5 until it comes to rest on the target track whereupon the track following stage S6, which forms no part of the present invention, commences.

In the long seek motion illustrated in FIG. 5, the head is accelerated during stages S1 and S2 until it reaches a maximum permitted velocity. The head is maintained at the maximum velocity during stage 3 and decelerated to rest during stages 4 and 5. The maximum velocity limitation is introduced since, in a practical system, a point of diminishing returns is reached beyond which access time cannot be significantly improved by permitting the actuator to attempt to further accelerate the head.

Figure 6:
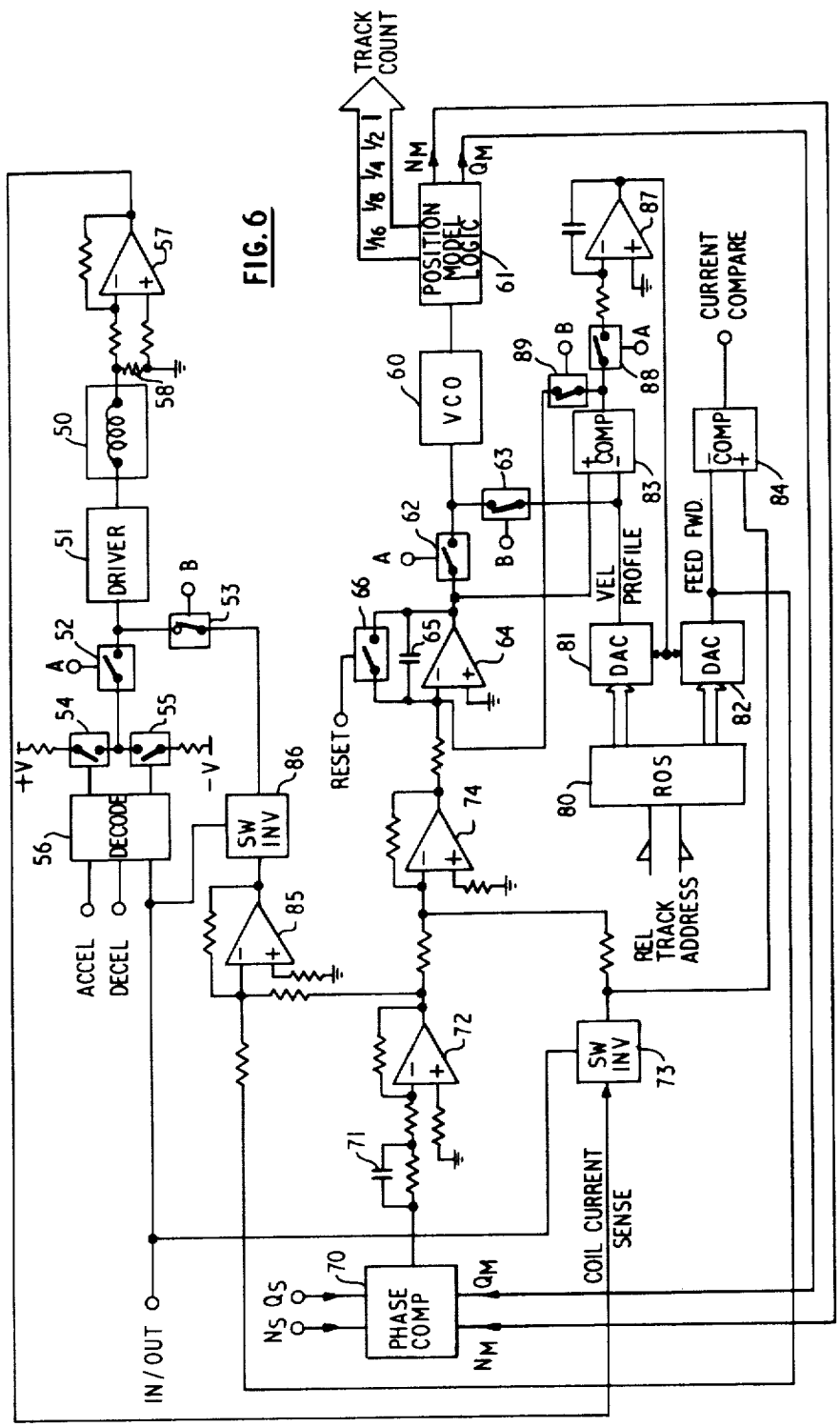
FIG. 6 shows the major portion of a sampled data servo positioning system according to the present invention which is employed to control the access motion of a transducer in a disk file.
Figure 7:
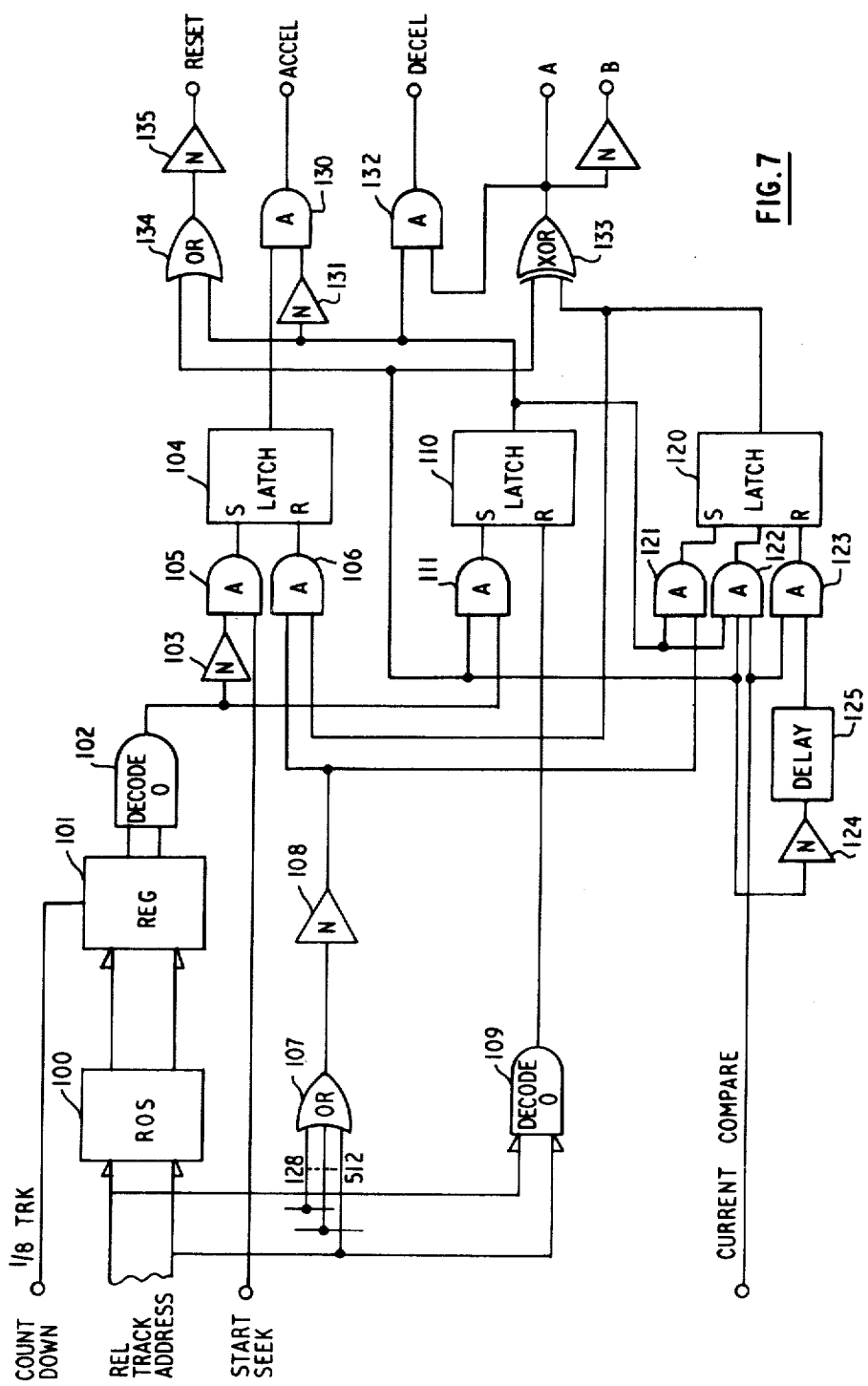
FIG. 7 shows a stage indicating circuit for providing stage indicating signals employed in the system of FIG. 6.

The access motion control system is illustrated in FIGS. 6 and 7. It is responsive to an initial seek command to move the head to a specified target track in the shortest time possible, consistent with the physical constraints on the system. In order to achieve minimum access times it is desirable to use maximum actuator power wherever possible. The system of FIGS. 6 and 7 has a first operational configuration, referred to as mode A, in which maximum power is applied. The system is in mode A during stages S1, S2 and S4 of the motion.

Another aspect of achieving minimum access times is the need to bring the head accurately and swiftly to rest at the target track without undershooting or overshooting the track so that subsequent corrective action or excessive settling time is required. Extremely close control of head motion is needed for this final approach and to permit corrective action by feedback, somewhat less than maximum power must be employed. The system of FIGS. 6 and 7 has a second operational configuration, referred to as mode B, in which such tight control of head motion is effected. The system is in mode B during stage S5 of the motion. Mode B is also employed to control the system during the constant velocity stage S3 of a long seek.

FIG. 6 shows the essential components of the preferred access motion control system according to the invention while FIG. 7 shows circuitry for producing various control logic signals for application to the system of FIG. 6. With reference to FIGS. 4 and 5, these signals comprise a signal A indicating mode A (waveforms (j)), a signal B (not shown) indicating mode B being the inverse of signal A, two signals ACCEL and DECEL (waveforms (g) and (i) respectively), and a signal RESET (waveform (m)). The other input signals to the system of FIG. 6 are an IN/OUT signal giving the direction of motion, a relative track address which is a digital representation of the current displacement in tracks, of the head from its target position, and the sampled analog position error signals Ns and Qs of FIG. 3.

In response to these inputs, the system of FIG. 6 develops a drive signal for a head actuator 50 of the moving coil type in driver amplifier 51 which causes the actuator to drive the head in the manner illustrated in FIGS. 4 and 5. The input to the driver 51 depends on whether the system is in mode A or mode B and is applied through analog FET switches 52 or 53 which are closed by mode signals A and B respectively. Movement of the head in response to driver current is detected at sampling times as described in connection with FIGS. 1 and 2 and indicated by the incremental quadrature position error signals Ns and Qs.

The velocity of the head is so high at its maximum that several tracks may be crossed between samples. Because of this the signals Ns and Qs are highly discontinuous and cannot reliably be used to generate track crossing pulses to step a counter holding a value equal to the position of the head relative to the target address.

Figure 8:
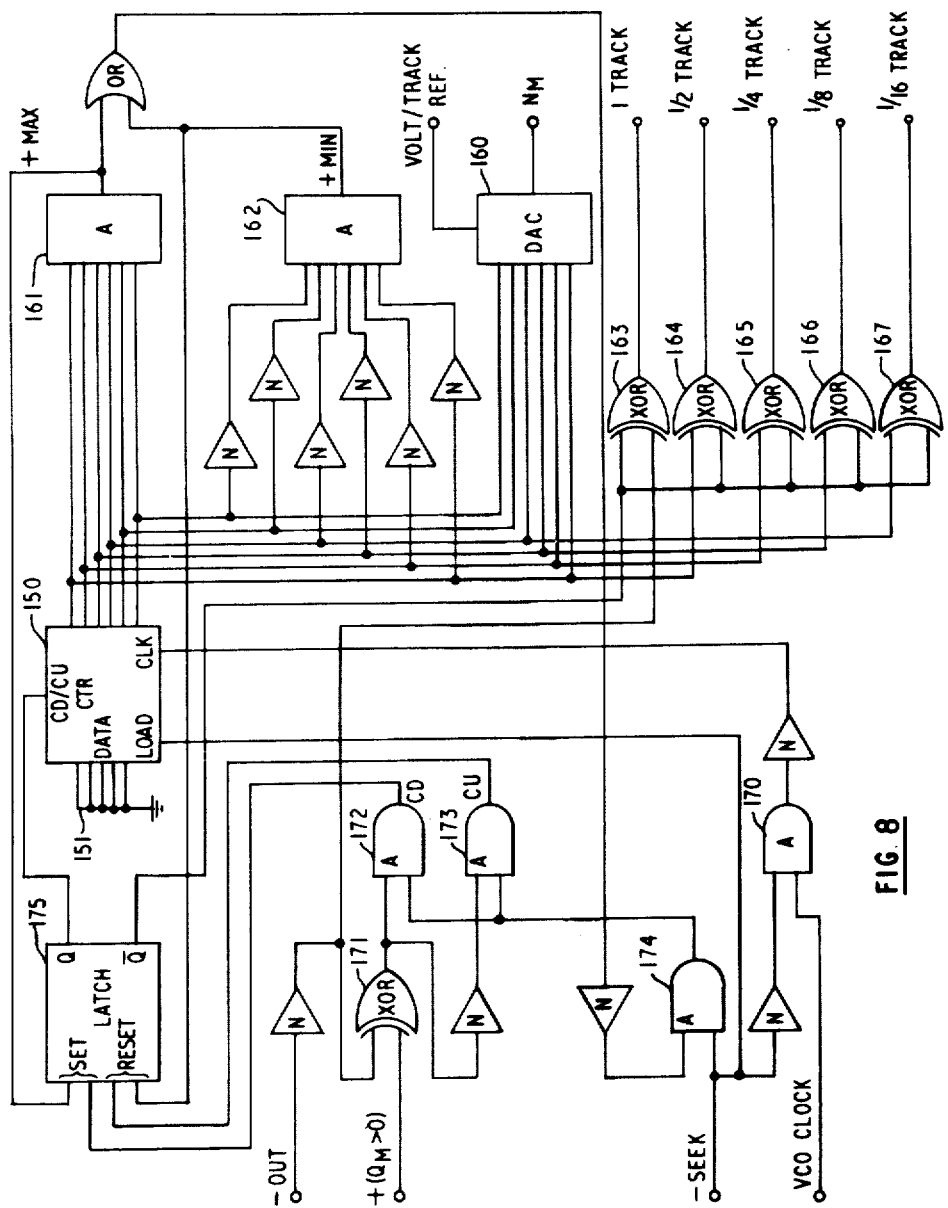
FIG. 8 shows in detail a position model logic circuit which is part of the system of FIG. 6.

Partly for this reason but also to enable the fine control required in mode B a position model circuit is provided consisting of VCO 60 and logic 61 (described in detail in FIG. 8).

VCO 60 and logic 61 are responsive to a continuous input representing head velocity, via either switch 62 or 63 depending on mode, to generate continuously available incremental model position error signals Nm and Qm (as shown in FIG. 3). In addition to the signals Nm and Qm the position model logic 61 also provides, directly, track counting pulses at increments of 1/16 of a track upwards.

Figure 9:
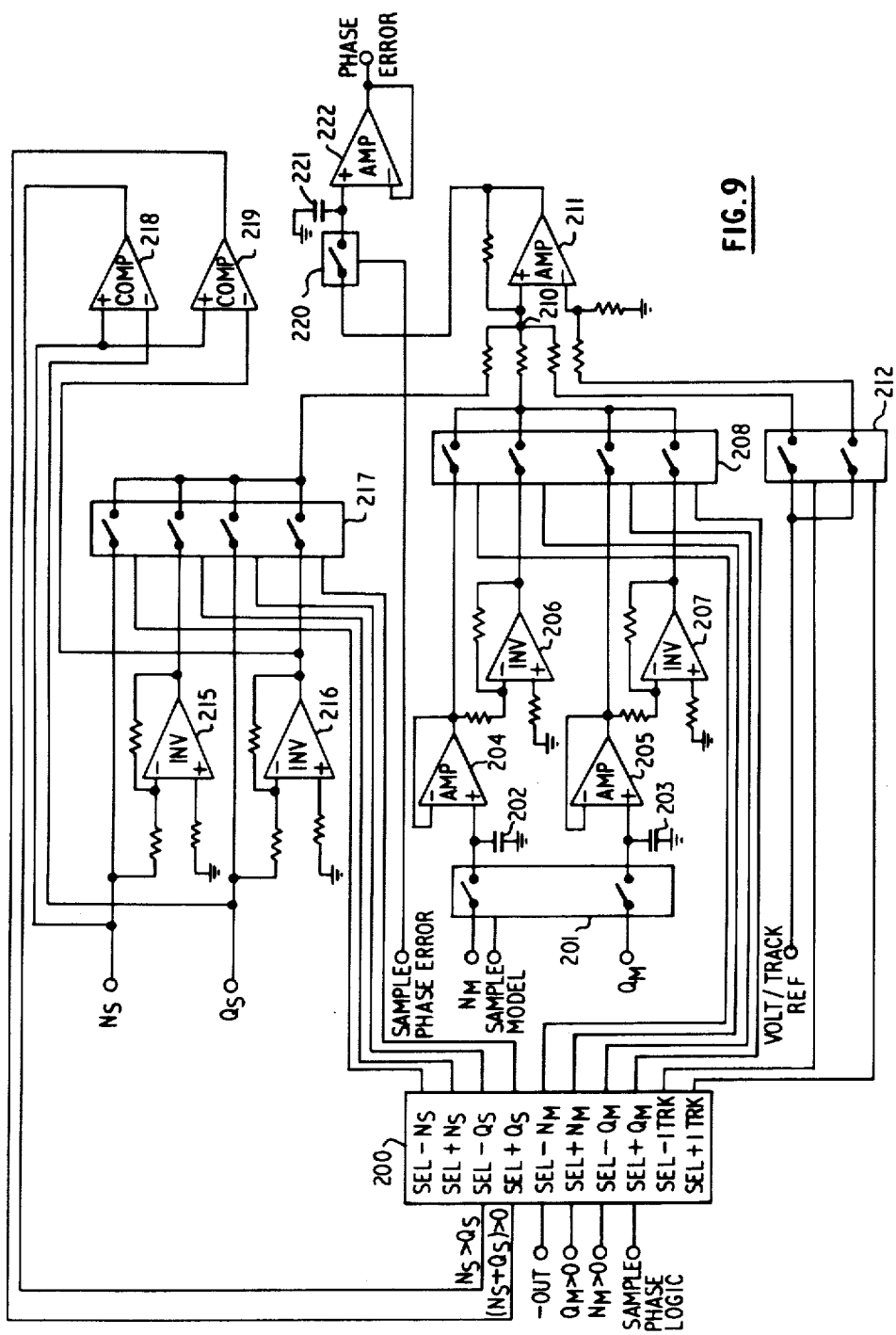
FIG. 9 shows in detail a phase comparator circuit which is part of the system of FIG. 6.
Figure 10:
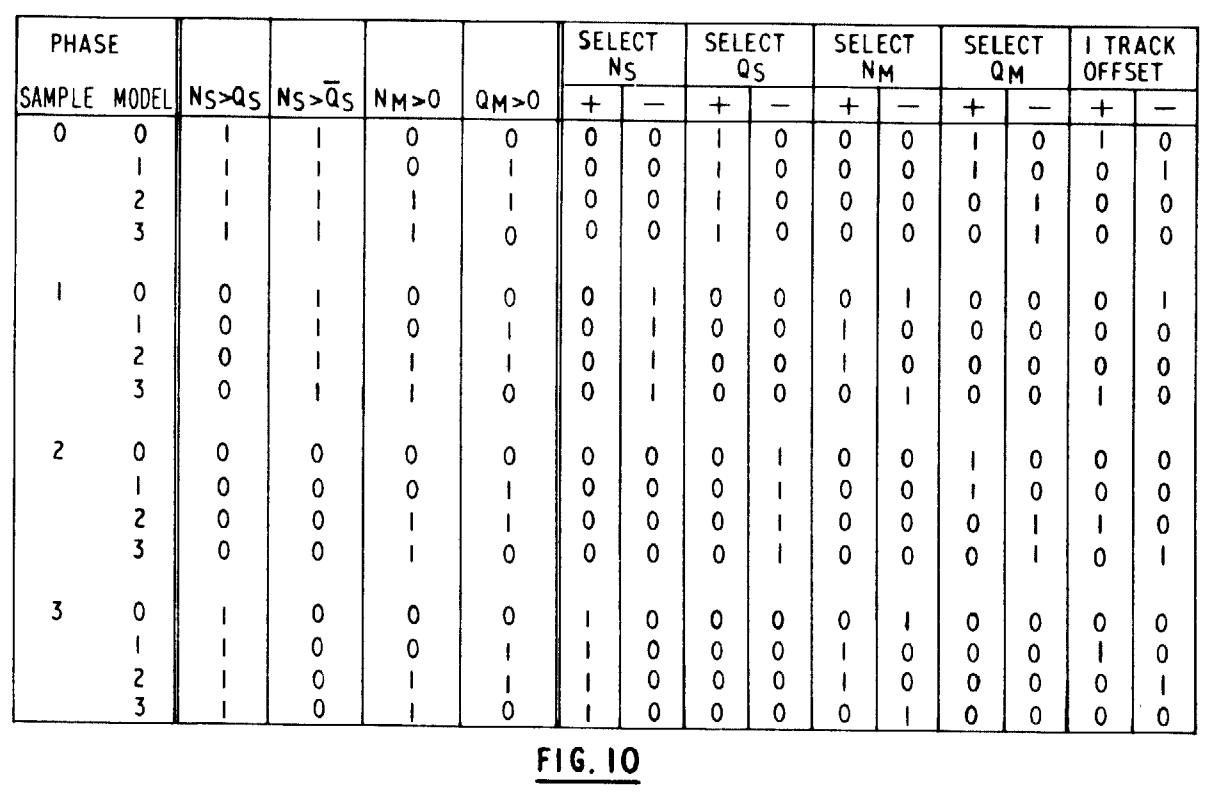

For both mode A and mode B operation, the model position signals Nm, Qm are compared in phase with the sampled transducer position signals Ns, Qs in a phase comparator circuit 70 described in detail in FIGS. 9 and 10. The phase comparator samples the two sets of quadrature signals at times synchronised with the passage of sectors beneath the head. The access phase error produced by the phase comparator 70 is passed through a lead-lag compensator formed by capacitor 71 and amplifier 72. The compensated signal is fed back either to the driver circuit via switch 53 or the model circuit via switch 62, depending on whether the system is in mode A or mode B.

The remainder of the FIG. 6 system can best be described in conjunction wioperation in the two modes.

In mode A, the full power supply voltage ±V is applied to voltage saturate driver 51 by way of switches 54 or 55. One of switches 54 and 55 is selected by a 2 out of 3 decoder 56 according to the state of the logic inputs ACCEL, DECEL and IN/OUT. The production of the ACCEL and DECEL signals will be described in connection with FIG. 7 but ACCEL corresponds to stage S1 of the seek motion and DECEL to stages S2 and S4 or S2/4. Effectively the decoder closes switch 54 if the Boolean condition ACCEL. IN+DECEL. OUT is satisfied and closes switch 55 is the condition ACCEL. OUT+DECEL. IN is satisfied.

In mode A, therefore, the actuator is being driven in open loop fashion so that the maximum force is available to move the head. In stage S1, the full power is applied to accelerate the head to its maximum velocity. After the head reaches a predetermined position, the motion progresses into stage S2 or S2/S4 and the system, still in mode A, applies full reverse power initially to reduce the acceleration of the head to zero. In the case of a long seek, stage S2 is terminated when the actuator coil current (waveform b, FIGS. 4 and 5), sensed by an amplifier 57 from a resistor 58, falls to zero as detected by a comparator 84. The motion then progresses into the constant velocity stage S3, whereupon the system switches to mode B, reverting to mode A at a predetermined distance from the target track, as indicated by the signal DECEL. The motion is now in stage S4 whose termination is signalled when the same comparator 84 indicates that the sensed actuator coil current is equal to the feedforward current function (waveform (c) FIG. 5). In the case of a short seek stages S2 and S4 are combined as stage S2/4 and only the second comparison takes place.

While the system is in mode A, the position model is forced to track the true head position by means of a feedforward signal, derived from the sensed coil current, and a closed feedback loop including phase comparator 70 and compensator 71, 72. This tracking is absolutely necessary as the phase error between the model position signals Nm, Qm and true head position signals Ns, Qs is only linear over about ±1 track width (see FIG. 3). Thus no greater error can be permitted or the model position signals will "slip" and a cumulative count of their increments will no longer be a reliable indication of track crossing and, consequently, of absolute head position.

Because of the relative infrequency of head position sampling, the feedback loop alone would be of too low bandwidth to maintain the position model within the necessary phase error limits. Accordingly, a continuous feedforward velocity signal is developed from the sensed coil current in a velocity model circuit and is effectively combined with the fed back phase error to control the model.

Since the coil current continuously represents the acceleration of the head, the velocity model is an integrator formed by amplifier 64 and capacitor 65. The model may be reset to zero at the end of a seek by the switch 66. When the input to the velocity model is the actuator coil current, the velocity signal produced is sufficiently good a representation of the actual head motion that it can provide the major control component to the position model input. However, random gain errors in the system would rapidly cause the position model to lag or lead the actual data head position. Thus, the phase comparator is used in a Type 2 feedback loop to servo the model position to the sampled position of the actual head. This arrangement enables the loop crossover frequency to be low, around 400 Hz, and therefore the loop can be made stable despite the phase lag due to sampling.

The sensed coil current, with polarity selected according to the direction of motion in switched inverter 73, is summed with the compensated phase error feedback signal at an input to amplifier 74 before being applied to the velocity model.

The operation of the system in mode B will now be considered. In this mode, it will be recalled, the actuator (and head) are servoed onto the position model signals Nm and Qm. As with mode A the phase lag in a feedback loop having only a sampled data input from the servo sectors is so great that such a loop on its own cannot be used to cause the head to follow the model with sufficient accuracy without becoming unstable. Thus, a feedforward current signal (waveforms (c) FIGS. 4 and 5) is generated by Read Only Store 80 and DAC 82 and applied to the driver 51 by way of amplifier 85 and switched inverter 86. This signal is a prediction, for a nominal system, of the current required to make the actuator move the head in a near time-optimal fashion during deceleration. This signal is generated during stage S4 of the motion as well as during stage S5 so that it is available for current comparison with the sensed actuator current in comparator 84 to determine the end of stage 84. The function is not constant during stages S4 and S5 but reduces gradually in absolute magnitude as the velocity reduces to take advantage of the dependence of the deceleration capability on the actuator coil back e.m.f.

During stage S3 of a long seek when the system is also in mode B, the output of the ROS 80 and DAC 82 to the current comparator 84 is zero.

As in the Oswald system and similarly to the mode A situation, provision of a feedforward signal as the major component of the actuator input signal ensures that the low feedback loop bandwidth is sufficient to provide fine control without causing stability problems.

The controlling input to the position model during mode B is a velocity profile signal (waveform (d), FIGS. 4 and 5) which, in conventional fashion, defines the desired variation of velocity with position for a near time-optimal deceleration. The velocity profile is produced by ROS 80 and DAC 81, as a function of the relative track address, and is applied via switch 63 to the position model VCO 60. The position model output signals Nm and Qm thus vary according to the desired velocity profile. Any phase error between the actual head position samples Ns, Qs and the desired position Nm, Qm is detected by phase comparator 70, compensated in network 71, 72 and summed with the feedforward current signal at an input of amplifier 85. The summed feedforward plus feedback control signal is finally applied via switched inverter 86 and analog switch 53 to the actuator driver amplifier 51. The head is thus forced to track the position model to within less than one track of error until it is brought to rest on the target track. Arrival at the target is indicated by the circuitry of FIG. 7 and the motion progresses to stage S6, the track following stage. The access motion is then complete.

The gain of both the DAC's 81 and 82 is adjusted during stages S1, S2 (or S2/4), and S4 (mode A) by an amplifier 87. The amplifier is responsive via switch 88 to the output of an equality comparator 83 which receives the velocity model output from amplifier 64 and the velocity profile signal from DAC 81. The comparator 83 is an overdriven difference amplifier producing both positive and negative outputs. The average comparator output level is established at the output of amplifier 87 which is connected in integrating configuration and is applied to DAC's 81 and 82.

The gain is adjusted so that the profile equals the velocity model output (actual head velocity) immediately prior to the system switching into mode B. Such an adjustment is necessary to prevent an immediate phase difference developing between the position model outputs Nm, Qm and the sampled head position Ns, Qs upon entering mode B. Similarly, before switching back into mode A at the end of stage S3 in a long seek, the output of comparator 83 is applied through switch 89 to amplifier 64 in order to ensure that the velocity model output is set equal to the velocity profile.

It should be pointed out that in FIGS. 4 and 5 the velocity profile waveform (d) is effectively a representation of the output of the read only store 80 prior to gain adjustment. The output of DAC 81 would, in practice, be reduced to close to the value of waveform (a) during acceleration, because of the action of the gain adjusting circuitry.

The input control signals for the circuit of FIG. 6 are generated by the stage indicating circuitry of FIG. 7. One input to FIG. 7 is the relative track address which is generated by conventional disk file circuitry (not shown) from the current position of the head, as deduced from the track count output from position model 61, and the target track address. Other inputs are the current compare signal from comparator 84 of FIG. 6 and a count down signal at increments of one eighth of a track provided by the position model logic. Finally, a "start seek" pulse is provided (see waveform e of FIGS. 4 and 5) to initiate a head movement between tracks.

The relative track address is applied to a read only store 100 which provides, for all seeks, an intercept distance at which the motion should move into stage S2 or S2/4 and the drive current should be reversed. This intercept value is loaded into register 101 which is decremented at ⅛ track intervals throughout the motion.

When the register contents reach zero, a zero detecting decoder 102 produces an output pulse.

Prior to reaching the intercept point, the output of zero detector 102 is inverted by a NOT circuit 103 and together with the start seek pulse sets latch 104 by means of AND 105. The output of the latch 104, shown as waveform f of FIGS. 4 and 5, is applied to AND 130 which receives a second input via NOT 131 from a second latch 110. Since the latch 110 is initially reset, AND 130 is satisfied and produces the ACCEL signal (waveform g, FIGS. 4 and 5) for application to the system of FIG. 6. This signal corresponds to stage S1 of the motion.

When a signal is produced by zero detector 102, upon the intercept distance being reached, an AND 111, which is enabled by the output of latch 104, is satisfied. The output of AND 111 sets latch 110 (waveform h, FIGS. 4 and 5) which via an AND 132 produces the DECEL signal (waveform i, FIGS. 4 and 5) to switch the system of FIG. 6 into stages S2, S2/4 or S4.

Throughout stages S1 and S2, an exclusive OR circuit 133 is responsive to the outputs of latch 104 and of a third latch 120 to produce the signals A or B, corresponding to modes A or B. The third latch 120 is initially reset and remains so throughout stages S1 and S2 or S2/4 so that mode A is indicated (as shown in waveform j of FIGS. 4 and 5).

In a long seek latch 120 is set by means of AND 122, (waveform (k) of FIGS. 4 and 5) when the current compare signal (waveform (l), FIGS. 4 and 5) is received to indicate the end of stage S2. The setting of latch 120 primes AND 106 but the AND is not satisfied for as long as the relative track address is greater than 127. Consequently both inputs to XOR 133 are up and the system is switched into mode B.

Three significant bits of the relative track address, namely those representing bit values of 128, 256 and 512, are applied to an OR 107 whose output is negated by NOT 108. When the relative track address falls below 128 the output of NOT 108 rises and latch 104 is reset via AND 106. This has the effect of switching the system back into mode A and producing the DECEL signal from AND 132 to commence stage S4.

The resetting of 104 resetting primes AND 123 via a NOT 124 and delay 125 to enable latch 120 to be reset when the current compare signal is next produced upon the coil current (waveform (b)) equalling the feedforward current (waveform (c)). When latch 120 does reset, stage S4 is terminated, the system reverts to mode B and stage S5 commences.

Stage S5 is itself terminated when zero detecting decoder 109 detects a relative track address of zero, indicating that the head has arrived on the target track. The output of decoder 109 resets latch 110. The output of latch 110 together with the output of latch 104 is applied to OR circuit 134. When both latches are down, which occurs when the target track is reached, the output of the OR falls and is negated by NOT 135 to supply the RESET signal (waveform (m) FIGS. 4 and 5) to reset the velocity model 64, 65 of FIG. 6 to zero.

On a short seek, operation of the circuit of FIG. 7 is similar except that latch 120 is set as soon as AND 121 is satisfied. This requires that the relative track address is less than 128 and that latch 110 has set, indicating the intercept distance has been reached.

The position model logic circuit 61 of FIG. 6 will now be described in detail with reference to FIG. 8. Only that portion of the circuit for generating the track count and the normal position model signal Nm is shown. The circuitry for generating Qm is identical to that for generating Nm with appropriate alteration of inputs.

In addition to the VCO clock input shown in FIG. 8, the position model logic receives a signal "SEEK" indicating when the system is in seek (access) and when in track following mode. Also applied as inputs are a signal "IN/OUT" giving the direction of motion and a signal "(Qm>0)" which is a logical indication of a comparison between the Qm output signal and a ground reference voltage.

The essential principle of the position model logic is that the output of VCO 60 ("VCO CLOCK"), whose frequency varies with velocity, is applied to an up-/down counter 150 which counts the input pulses and reverses the direction of counting when it is full or empty. Thus the counter output rises and falls in the manner of an incremental position signal. The digital counter output is converted to the analog model position signal Nm by a digital to analog converter 160.

Initially, when the system is in track follow mode, the "SEEK" signal is applied to the LOAD input of the counter to cause it to be set to the binary value 100,000 by means of ground connections 151 and 152. This corresponds to the zero value of Nm when the head is on track. The corresponding counter in the circuitry for generating Qm (not shown) is set to maximum or minimum count since the head in on track.

When "SEEK" rises, the access motion begins and the VCO clock signal is gated through AND 170 to the clock input of counter 150. To determine whether the counter counts up or down, it is necessary to consider the direction of motion, given by "IN/OUT" and whether or not Nm is moving from an odd track towards an even or vice versa. The latter information is effectively provided by the logic signal (Qm>0) which, it can be seen from FIG. 3, delimits the linear portions of Nm and by its value indicates their slope. These two signals are applied to an exclusive OR circuit 171 whose output is in turn gated through either AND 172 or 173 to produce a count down signal "CD" or a count up signal "CU". Whichever of the signals CD or CU is produced sets or resets a latch 175 whose set output is applied to the count up/count down control input of counter 150. The latch 175 may only be set in this way initially when the system is in track follow mode and thus SEEK is down.

Subsequently, during the access motion, alternation of the count direction is controlled by "MAX" and "MIN" signals produced from the counter output lines by AND 161 and AND 162 respectively. In this way the counter 150 counts alternately up and down during the seek motion at a rate determined by head velocity and the output from DAC 160 is the model position signal Nm of FIG. 3.

The other function of the position model logic to produce the track counts is effected by exclusive OR circuits 163–167. The unit track count is produced by XOR 163 directly from the latch 175 inverted output and the IN/OUT direction signal since the polarity of the model position signals is inverted when the direction is reversed. Thus track crossings are indicated with reference to FIG. 3 by the negative going zero crossings of Nm. Fractional track signals are produced by the exclusive or of the same latch 175 inverted output with the appropriate bit line of counter 150.

It remains to describe the phase comparator 70 of FIG. 6 which is shown in detail in FIG. 9 and whose logical function is illustrated by the truth table of FIG. 10. To understand the function of the phase comparator it will also be helpful to refer to FIG. 3. The waveforms of FIG. 3 illustrate the position sample signals Ns and Qs, the actual incremental position variation of the head Ns' and Qs' as it crosses a number of tracks and the model position signals Nm and Qm. On the left the true position is lagging the model position, in the center they are in phase and on the right the true position leads the model. At absolute positions d1, d2, d3 and d4 it is assumed that the head passes over a servo sector and sampling occurs, the new values of Ns and Qs being held until the succeeding sample.

Since there is no fixed relationship between track crossings and the sampling times, sampling may occur anywhere on the N and Q waveforms. Because the waveforms have discontinuities it is necessary to ensure that a phase comparison is only made in their linear regions. The use of quadrature signals ensures that one of the N or Q waveforms is linear while the other reaches a peak. A further complication is caused by the alternation of both waveform polarity and slope sign. For these reasons, a simple difference amplifier is inadequate to provide the phase error between the sample position and model signals. Such a difference would alternate randomly in sign.

Accordingly, the circuit of FIG. 9 employs a logic network 200 which, in response to certain inputs produces switching or selection signals to select the most appropriate pair of sampled position and model signals for comparison. The logic network may also select a +1 track offset voltage to shift one of the selected signals in voltage.

The inputs and outputs to the logic network 200 are shown in FIG. 9 and the logical correspondence between them is shown in the truth table of FIG. 10 for an inward seek. For an outward seek the output selections of the truth table must be interchanged (e.g. a selection of +Qs for an IN seek becomes a selection of −Qs for an OUT seek). The logic network is activated by a "sample phase logic" signal generated at the end of every servo sector by sample logic 40 (FIG. 2). The inputs to the logic network are the logical results of various comparisons of the sampled position signals Ns, Qs and model position signals Nm, Qm.

Referring to the truth table of FIG. 10, any cycle of the N and Q signals may be regarded as having four phases, labelled 0 to 3, corresponding to four quadrants of the cycle. The left hand two columns of the truth table list all possible combinations of position sample and model position phase which can occur. The next four columns indicate for each of these phase combinations which of the input comparison conditions are true and which are false. The next eight columns indicate the pair of sampled position and model position signals which must be selected to give a consistent phase comparison. The right hand two columns select a track offset signal for some combinations of phases.

Returning now to FIG. 9, the four quadrature input signals Ns, Qs Nm and Qm are applied to a network of switches and inverters which are controlled by the output selection lines from network 200. The model position signals Nm and Qm are sampled by switch 201 at the end of a sector upon receipt of a "sample model" signal generated by sample logic 40 (FIG. 2). The sampled signals are stored on capacitors 202 and 203. The sampled model signals are amplified by amplifiers 204 and 205 and inverted by inverting amplifiers 206 and 207. Both the inverted and uninverted model position signals are then applied to a switch 208 one of whose contacts is closed by the activated selection line from network 200.

The selected sample from switch 208 is applied to a summing junction 210 at the input of a summing amplifier 211. Also applied to the summing junction is the "−1 track" offset voltage from a switch 212. This switch receives as input the analog voltage per track reference which is selected for application to the summing junction 210 or to the negative input of amplifier 211 by one of the "select track offset" signals from network 200.

The sampled position signals Ns and Qs are inverted in amplifiers 215 and 216. Both the inverted and uninverted samples are applied to a switch 217 which passes one of them to summing junction 210 in dependence on the selection input it receives from network 200. The inverted and uninverted position samples are also applied to a comparator 218 which provides an output to network 200 if Ns>Qs and to a comparator 219 which provides an output to network 200 if Ns+Qs>0.

After the logic network has been activated by the "sample phase logic" signal and the model has been sampled by the "sample model" signal, a further signal "sample phase error" is produced by sample logic 40 of FIG. 2. This is applied to a switch 220 to sample the output of summing amplifier 211 and to store it on capacitor 221. An output amplifier 222 amplifies the voltage on capacitor 221 and provides a phase error signal which is applied to the compensator network 71, 72 of FIG. 6. The phase error is fed back to cause either the model to track the actuator or the actuator to track the model as described in connection with FIG. 6.

The sampled data servo positioning system described above has been described in connection with a head positioning system for a magnetic disk file. The invention is not restricted to this application and may be applied to other positioning systems in which the position of a member must be controlled from sampled position data.

What is claimed is:

1. A sampled data servo positioning system for moving a member between a current and a target position comprising:
   an actuator responsive to applied drive signals to move such a member;
   a position transducer movable with the member for producing signals in response to motion thereof;
   position signal generating means responsive to the position transducer signals to produce at least one incremental position signal representative of the position of the member at sampling times;
   a model responsive to an input signal to produce at least one continually available model incremental position signal;
   profile signal generating means for generating a profile signal, corresponding to a predetermined velocity profile, as an input signal for the model;
   phase comparing means for comparing and indicating the phase difference between the sampled and model position signals at the sampling times;
   actuator feedforward signal generating means for generating a feedforward control signal for the actuator corresponding to the predetermined velocity profile;

and stage indicating means for indicating various stages of the motion in accordance with predetermined conditions;

the system being characterized by switching means responsive to the stage indicating means to switch the system between first and second operational configurations, by a source of saturation control signals of opposite polarity for application to the actuator to cause maximum acceleration or deceleration thereof, and by means for deriving a continuous performance signal representative of actuator motion; and wherein, in the first operational configuration, the switching means connects the saturation control signal source to the actuator and connects a combination of the actuator performance signal as a feedforward input and the position phase difference signal as a feedback input to the model so that the model tracks the actuator system, and wherein, in the second operational configuration, the switching means connects the model input profile signal to the model, and connects a combination of the actuator feedforward control signal as a feedforward input and the position phase difference signal as a feedback input to the actuator so that the actuator tracks the model.

2. A system as claimed in claim 1 in which the motion includes a first acceleration stage followed by a second acceleration terminating stage, the switching means being responsive to a first stage indication to switch the system into its first operational configuration with the acceleration saturation control signal applied to the actuator and being responsive to a second stage indication to maintain the system in its first operational configuration but with the maximum deceleration saturation control signal applied to the actuator.

3. A system as claimed in claim 2 which includes a relative position indicator for providing a digital representation of the target position relative to current position of the member and responsive to increments of the model position signal to alter the indication, and in which the stage indicating means is responsive to the position indicator to change from the first to the second stage at a relative position precalculated from the initial and target positions.

4. A system as claimed in claim 3 in which the motion includes a final deceleration to the target position consisting of penultimate and ultimate stages, the switching means being responsive to a penultimate stage indication to switch the system into its first operational configuration with the maximum deceleration saturation control signal applied to the actuator and responsive to an ultimate stage indication to switch the system into its second operational configuration.

5. A system as claimed in claim 4 in which the stage indicating means is responsive to equality of a signal representative of the actuator current and the actuator feedforward signal to change from the penultimate to the ultimate stage.

6. A system as claimed in claim 5 in which the motion includes a constant velocity stage corresponding to movement at a maximum permitted velocity, the switching means being responsive to a constant velocity stage indication to switch the system into its second operational configuration.

7. A system as claimed in claim 6 in which, for motions of greater than a predetermined distance, the stage indicating means is responsive to the signal representative of actuator current falling to zero to change from the second to the coast stage.

8. A system as claimed in claim 7 in which the stage indicating means is responsive to the position indicator to change from the coast to the penultimate stage at a predetermined distance from the target position.

9. A system as claimed in claim 8 in which the model comprises both a velocity model and a position model which produces the model incremental position signal, the actuator performance signal being representative of actuator current and being applied to the velocity model which integrates it to produce a model velocity signal for application to the position model in the first operational configuration and in which the profile signal is a velocity profile signal which is applied directly to the position model in the second operational configuration.

10. A system as claimed in claim 9 in which the profile signal generating means includes a store from which the velocity profile signal is read out as a function of the position of the member; the system including normalising means for normalising the velocity profile to the value of the model velocity output when the system is switched from its first to its second configuration.

11. A system as claimed in claim 10 in which the position model comprises a voltage controlled oscillator to which either the model velocity or the velocity profile signal is applied; a counter for counting the oscillator output pulses; means for reversing the direction of counting in response to the counter reaching either a maximum or a minimum count; and a digital to analog converter for converting the count to an analog model incremental position signal.

12. A system as claimed in claim 1 in which the actuator feedforward signal generating means includes a store from which the actuator feedforward control signal is read out as a function of the position of the member, the feedforward control signal being zero at greater than a predetermined distance from the target position, and being of substantially trapezoidal form between the predetermined distance and the target position so as to include an initial portion of gradually diminishing amplitude and a terminal portion of steeply falling amplitude which falls to zero at the target position.

13. A sector servo disk file comprising a positioning system as claimed in claim 1 in which the position transducer is a transducer for reading information from the disk file and the position signal generating means is responsive to signals read by the transducer from the servo sectors of the disk file.

* * * * *